United States Patent

Johnson et al.

[11] Patent Number: 6,088,452
[45] Date of Patent: Jul. 11, 2000

[54] ENCODING TECHNIQUE FOR SOFTWARE AND HARDWARE

[75] Inventors: Harold Joseph Johnson, Nepean; Yuan Xiang Gu, Kanata; Becky Laiping Chang, Ottawa; Stanley Taihai Chow, Nepean, all of Canada

[73] Assignee: Northern Telecom Limited, Montreal, Canada

[21] Appl. No.: 08/611,968

[22] Filed: Mar. 7, 1996

[51] Int. Cl.⁷ ........................................... H04L 9/00
[52] U.S. Cl. .................... 380/28; 380/3; 380/4; 380/59; 395/186
[58] Field of Search ............... 380/3, 4, 28, 59; 395/186

[56] References Cited

U.S. PATENT DOCUMENTS

| | | | |
|---|---|---|---|
| 4,525,599 | 6/1985 | Curran et al. | 178/22.08 |
| 4,634,807 | 1/1987 | Chorley et al. | 178/22.08 |
| 4,646,234 | 2/1987 | Tolman et al. | 380/4 X |
| 4,740,890 | 4/1988 | William | 364/200 |
| 4,864,494 | 9/1989 | Kobus, Jr. | 364/200 |
| 4,866,769 | 9/1989 | Karp | 380/4 |
| 4,903,296 | 2/1990 | Chandra et al. | 380/4 |
| 4,937,863 | 6/1990 | Robert et al. | 380/4 |
| 5,047,928 | 9/1991 | Wiedemer | 364/406 |
| 5,123,045 | 6/1992 | Ostrovsky et al. | 380/4 |
| 5,212,728 | 5/1993 | Glover et al. | |
| 5,287,407 | 2/1994 | Holmes | 380/4 |
| 5,359,659 | 10/1994 | Rosenthal | 380/4 |
| 5,522,036 | 5/1996 | Shapiro | 395/183.14 |
| 5,613,004 | 3/1997 | Cooperman et al. | 380/28 |

OTHER PUBLICATIONS

"Operating System Protection Through Program Evolution", F.B. Cohen, Computer & Security, vol. 12, 1993 Elsevier Science Publishers Ltd., pp. 565–584.
Handbook of Theoretical Computer Science, Elsevier/MIT Press, ISBN 0–444–88074–7, vol. A, Chapter 4.
"An Introduction to Kolmogorov Complexity and Its Applications", M. Li and P. Vitanyi, ISBN 0–387–94053–7, Section 2.1: "The Invariance Theorem".
"Compilers: Principles, Techniques and Tools", A.V. Aho et al, ISBN 0–201–10088–6, Addison–Wesley Publishers, Mar. 1988; Section 9.4: "Basic Blocks and Flow Graphs", pp. 528–534.

Primary Examiner—Thomas H. Tarcza
Assistant Examiner—Pinchus M. Laufer
Attorney, Agent, or Firm—Yoshiharu Toyooka

[57] ABSTRACT

An encoding technique of the invention protects software programs and hardware designs from being copied, tampered with, and its functions from being exposed. The software programs and hardware designs (collectively called programs) thus encoded still remain executable. The encoding technique employs the concept of complexity of programs and produces proximity inversion in terms of functions contained in the programs, while preserving the behaviors. Various embodiments are possible to achieve this encoding which includes, for example, cascading and intertwining of blocks of the programs.

36 Claims, 4 Drawing Sheets

This network produces a synchronous (clocked) adder from an asynchronous adder

ENCODING TECHNIQUE FOR SOFTWARE AND HARDWARE

FIELD OF THE INVENTION

The present invention is directed generally to a construction process for software programs or hardware designs so that the intelligence contained therein is protected from being discovered or tampered with. In particular, an executable program design is encoded by the processes of cascading and intertwining in addition to periodic checking code insertion so that the encoded program design is protected yet remains executable.

BACKGROUND OF THE INVENTION

The need to protect information contained in software programs and hardware designs, or to provide tamper protection, is not new. Many mechanisms have been applied to achieve such objectives.

The article entitled "Operating System Protection Through Program Evolution" by F. B. Cohen in Computer & Security, Vol. 12, (1993) pp. 565–584 proposes such a mechanism. It describes attacks and defense of a computer operating system, as follows:

"One of the major factors in the successful application of information protection techniques is the exploitation of computational advantage. Computational advantage shows up historically in cryptography, where Shannon's theory clearly demonstrates the effect of "workload" on the complexity of cryptanalysis, and introduces the concept of diffusion and confusion as they relate to statistical attacks on cryptosystems. Most modern cryptosystems exploit this as their primary defenses. The same basic principle applies in computer virus analysis in which evolutionary viruses drive the complexity of detection and eradication up dramatically and in password protection in which we try to drive the number of guesses required for a successful attack up by limiting the use of obvious passwords. One of the major reasons attacks succeed is because of the static nature of defense, and the dynamic nature of attack." (page 565)

"The ultimate attack against any system begins with physical access, and proceeds to disassembly and reverse engineering of whatever programmed defenses are in place. Even with a cryptographic key provided by the user, an attacker can modify the mechanism to examine and exploit the key, given ample physical access. Eventually, the attacker can remove the defenses by finding decision points and altering them to yield altered decisions." (page 565–66)

"Without physical protection, nobody has ever found a defense against this attack, and it is unlikely that anyone ever will. The reason is that any protection scheme other than a physical one depends on the operation of a finite state machine, and ultimately, any finite state machine can be examined and modified at will, given enough time and effort. The best we can ever do is delay attack by increasing the complexity of making desired alterations." (page 566)

"The ultimate defense is to drive the complexity of the ultimate attack up so high that the cost of attack is too high to be worth performing. This is, in effect, security through obscurity, and it is our general conclusion that all technical information protection in computer systems relies at some level either on physical protection, security through obscurity, or combinations thereof.

The goal of security through obscurity is to make the difficulty of attack so great that in practice it is not worth performing even though it could eventually be successful. Successful attacks against obscurity defenses depend on the ability to guess some key piece of information. The most obvious example is attacking and defending passwords, and since this problem demonstrates precisely the issues at hand, we will use it as an example. In password protection, there are generally three aspects to making attack difficult. One aspect is making the site of the password space large, so that the potential number of guesses required for an attack is enormous. The second aspect is spreading the probability density out so that there is relatively little advantage to searching the space selectively. This is basically the same as Shannon's concept of diffusion. The third aspect is obscuring the stored password information so that the attacker cannot simply read it in stored form. This is basically the same as Shannon's concept of confusion." (page 566)

The article proposes an evolutionary defense as follows:

"A more practical solution to this problem might be the use of evolutionary defenses. To make such a defensive strategy cost effective for numerous variations (e.g. one per computer worldwide), we probably have to provide some sort of automation. If the automation is to be effective, it must produce a large search space and provide a substantial degree of confusion, and diffusion. This then is the goal of evolutionary defenses.

Evolution can be provided in many ways and at many different places, ranging from a small finite number of defenses provided by different vendors, and extending toward a defensive system that evolves itself during each system call. With more evolution, we get less performance, but higher cost of attack. Thus, as in all protection functions, there is a price to pay for increased protection. Assuming we can find reasonably efficient mechanisms for effective evolution, we may be able to create a great deal of diversity at practically no cost to the end-user, while making the cost of large scale attack very high. As a very pleasant side effect, the ultimate attack may become necessary for each system under attack In other words, except for endemic flaws, attackers may again be reduced to a case-by-case expert attack and defense scenario involving physical access." (page 567)

A large number of patents exist which describe various ways of protecting software and/or hardware and information contained therein. The following are only a few examples of patents in the related field.

According to U.S. Pat. No. 4,525,599 issued on Jun. 25, 1985 to Curran et al. and entitled "Software Protection Methods and Apparatus", in order to protect copying of ROM-resident software a protection circuit includes encryption/decryption means which is coupled between the microprocessor and ROM memory.

According to U.S. Pat. No. 4,634,807 issued on Jan. 6, 1987 to Chorley et al. and entitled "Software Protection Device", in order to prevent the unauthorized copying of software a software module of this invention is encrypted using DES and the key is encrypted using the public key of a public/private key algorithm.

In U.S. Pat. No. 4,740,890 issued on Apr. 26, 1988 to William and entitled "Software Protection System With Trial Period Usage Code and Unlimited Use Unlocking Code Both Recorded on Program Storage Media", after the trial period, the disk becomes inoperable as the system will prevent further use of the program until a proper locking code is inserted.

U.S. Pat. No. 4,866,769 issued on Sep. 12, 1989 to Karp and entitled "Hardware Assist for Protecting PC Software" describes a copy protection technique of PC software. By this technique, a unique ID is stored in ROM of a personal computer in which software on a diskette is to be used. This ID is accessible to the user of the computer. A vendor who wishes to protect his diskette-distributed software from illegal copying or use provides a source ID on the diskette.

According to U.S. Pat. No. 4,903,296 issued on Feb. 20, 1990 to Chandra et al. and entitled "Implementing a Shared Higher Level of Privilege on Personal Computers for Copy Protection of Software", the original medium is functionally unreproducible until it is modified by the execution of a program stored in a tamperproof co-processor which forms a part of the computing machine.

The license management system of U.S. Pat. No. 4,937,863, issued on Jun. 26, 1990 to Robert et al. and entitled "Software Licensing Management System", maintains a license unit value for each licensed program and a pointer to a table identifying an allocation unit value associated with each use of the licensed program. In response to a request to use a licensed program, the license management system responds with an indication as to whether the license unit value exceeds the allocation unit value associated with the use.

U.S. Pat. No. 5,047,928 issued on Sep. 10, 1991 to Wiedemer and entitled "Billing System for Computer Software" teaches a billing system in which the application program is enciphered in accordance with an algorithm driven by a numeric key. The user's computer is provided with a hardware security module and a removable billing module, both of which carry unique codes.

The system of U.S. Pat. No. 5,123,045, issued on Jun. 16, 1992 to Ostrovsky and entitled "Comprehensive Software Protection System", provides pattern of access protection to memory during execution of a program and also provides protection of the data stored in memory. The patent describes a data processing system which includes a plurality of "buffer" data structures for storing encrypted software and data in unprotected memory. The software and data are stored in accordance with pseudo-random mapping such that the pattern of access during execution of the program reveals no information to adversarial observers. The scheme is secure assuming the existence of a physically shielded chip containing a constant number of registers and the existence of any one-way function.

In U.S. Pat. No. 5,212,728 issued on May 18, 1993 to Glover et al. and entitled "Dynamic Trace Elements", tracer circuitry connects to the rest of the circuitry of a product but its function has nothing to do with the actual operation of the product. One or more lines of tracer code are embedded in lines of real code. The tracer software code interacts with the tracer circuitry. Even though the tracer software code does nothing with respect to the running of the real software code, it reacts with actual hardware, i.e. the tracer circuitry. A copier who has disassembled the program would have considerable difficulty in determining this fact. In another embodiment, one or more lines of tracer codes can be embedded in the real code but they interact with lines of real code to produce results which are not related to the operation or running of the real code.

In the protection scheme of U.S. Pat. No. 5,287,407, issued on Feb. 15, 1994 to Holmes and entitled "Computer Software Protection", a master copy of a software file has within it a predetermined block of data. When a copy of the file is made, that block of data within the copied file is located and overwritten with data identifying the copied file. When an unauthorized copy is found, the data identifying the copy can be read and the source of the unauthorized copy may be traced.

Generally speaking, protection techniques including some of those discussed above can be understood, basically, as applying the opposites of "clear design" principles. In engineering software or hardware, there are certain principles which are applied to make the design clear, understandable, manageable, and well organized. In software, such principles are called "principles of software engineering". Now, plainly, if application of a set of principles makes designs easier to understand and modify, then application of their opposites is likely to make designs harder to understand and modify.

In software, for example, the choice of mnemonic variable names which suggest the actual uses of the variables is important to program understanding. Hence choosing variable names which either suggest nothing about their use, or suggest a use different from actual uses, would make understanding and modifying the software more difficult.

Let us call the reverse application of "clear design principles" by the name "anti-clear design".

The present invention is analogous in purpose and intended effect with such approaches, that is to say, both "anti-clear design" approaches and the present invention are intended to protect intellectual property and frustrate (effective) tampering. However, the basis for the instant inventive process is not in applying the opposites of "clear design principles". The invention differs in two profound ways from such previous approaches.

Firstly, the previous approaches don't work against a truly determined attack. Many kinds of obfuscation are easily penetrated in "anti-clear design" approaches by the kinds of analysis tools found in, for example, data flow analyzers, optimizing compilers, or program slicing tools.

Secondly, the instant process is founded on notions from the Kolmogorov complexity and computational graph theory, not on reversing the rules of thumb from software engineering or the principles of clear hardware design. Hence where the kinds of operations employed in an "anti-clear design" process are shallow and local, those involved in the instant process are deep and global.

The Kolmogorov complexity theory provides a way of measuring the "essential" information content of a piece of information (of any kind). In ordinary information theory, for example, the information represented by sending a message consisting of the binary encoding of the number $\pi = 3.14156 \ldots$ is infinite: there are infinitely many digits and the number is non-repeating. However, the essential information is not infinite: it is possible to define the string of digits in terms of a small program which computes as many digits of $\pi$ as desired. Since the program is small, the amount of "essential" information in $\pi$ is also small. In the present disclosure, we use analogous notation to deal with the essential complexity of a computer program P and the essential complexity of deriving another program Q from a program P. For an introduction to Kolmogorov complexity, reference can be made to the "Handbook of Theoretical Computer Science", Elsevier/MIT Press, ISBN 0-444-88074-7 (Volume A, Chapter 4).

Extending this concept, we can measure the magnitude of the difference between programs by what we call the Kolmogorov directed distance between them. For any fixed program alphabet and encoding method, the Kolmogorov directed distance from program P to program Q is defined as the length of the smallest program which takes P as input and yields Q as output. Although this distance will vary from one encoding to another, the variations are sharply restricted according to the invariance theorem of the Kolmogorov complexity theory. Reference can also be made to "An Introduction to Kolmogorov Complexity and its Applications" by Ming Li and Pau Vitanyi, ISBN 0-387-94053-7: Section 2.1: "The Invariance Theorem". Note the quote in Example 2.2: "The Invariance Theorem in fact shows that, to express an algorithm succinctly in a program, it does not matter which programming language we use (up to a fixed additive constant that depends only on the two programming languages compared)".

A design of the kind produced by the process of the invention is analogous to an encrypted message, where discovery of the message without knowledge of the key is possible in principle, but is so difficult in practice that the message is only very rarely discovered without the key. Despite the analogy with cryptography in terms of purpose and intended effect, however, the invention is not cryptographic. A software program or hardware device resulting from the present process is executable "as is": its information does not need to be decoded for use. The process takes information which is executable (software which can be run on a computer or a hardware design which can be used to produce an integrated circuit or other hardware device), and transforms it into a new form which is still executable, but which protects the content from both disclosure and tampering.

The process preserves the value of designs: there is no need for decryption to recover the value, and no need for a key to access the value. An encrypted message, however, has value only in connection with its key, and its value (the information in the message) can only be obtained by decryption. Without the key or decryption, the encrypted message itself is of no practical value. Designs encoded according to the invention are useful in themselves with no key: encrypted messages are useful only with a key and only when decrypted.

OBJECTS OF THE INVENTION

It is therefore an object of the invention to provide a process of encoding an executable program design for security protection.

It is another object of the invention to provide a process of encoding an executable program design for tamper protection and concealment of information contained therein such that the encoded program design remains executable.

It is a further object of the invention to provide a process of encoding an executable program design for tamper protection and concealment of information contained therein while the encoded program design remains executable.

It is yet a further object of the invention to provide a process of encoding an executable program design for tamper protection and concealment of information contained therein while the encoded program design remains executable but contains a trap which may be activated to render the program design non-executable.

SUMMARY OF THE INVENTION

Briefly stated the invention is directed to a process of encoding an executable program design for tamper protection and concealment of information contained therein such that the encoded program design remains executable. According to one aspect of the invention, the process comprises steps of providing one or more different program designs which are each similar to the executable program design as a whole or in part, each program design having sufficient length and width for a desired security level. The process further includes a step of intertwining the executable program design and the one or more different program designs so that outputs of the encoded executable program design depend upon all the inputs of the executable program design and different program designs.

According to another aspect of the invention, the process comprises steps of generating one or more checking cascades which are each similar to the executable program design, each checking cascade having sufficient length and width for a desired security level. The process includes further steps of inserting periodic checking codes distributed over the checking cascades, the checking codes monitoring expected output of the checking cascades at predetermined points in the executable program design, and of intertwining the executable program design and the checking cascades so that outputs of the encoded executable program design depend upon all the inputs of the executable program design and checking cascades.

According to another aspect of the invention, the process includes further steps of generating a clocking cascade which carries a tampering flag and a•clock which is advanced at least one tick per non-branching program step, the tampering flag to be set when the match is not found, and intertwining the executable program design, clocking cascade and checking cascade.

According to another aspect of the invention, the process includes a further step of adding a history checking code.

According to yet another embodiment of the invention, the process includes an additional step of appending a trap code to the clocking cascade, the trap code to be executed in response to the Boolean tampering flag and the clock.

In this application, we deal only with programs with unaliased data accesses, that is, those representable as "pure" Data-Flow graphs. Aggregate data can readily be handled by well known transformations which convert aggregate data into scalar data plus conditional code. This transformation can be performed before encoding according to the instant invention.

DETAILED DESCRIPTION OF THE PREFERRED EMBODIMENTS

As stated earlier, a software program or a hardware design (hereinafter called simply program) such as a netlist for an integrated circuit, is pure information. As such, it can obviously be changed by any recipient. However, there is a difference between an arbitrary change (for example, deletion or destruction of a program is certainly a change) and an effective change. The intent when altering a program is normally to create a new program which is behaviorally similar to the original, but behaviorally modified in a way useful to the modifier. For example, a program—say, a word processor—may be provided as a free sample to a potential customer, and may be so designed to run as a word processor until a certain date in the near future. A useful modification for the recipient would be to change that date into one far in the future, thereby obtaining permanent access to the word processor.

In this disclosure, a program is called effectively immutable if its nature is such that performing any such behaviorally small, but non-superficial, recipient-useful change from the design is exceedingly difficult—difficult enough to discourage even a very determined recipient.

The view of a program taken in this disclosure is based on a standard view used in optimizing compilers, but modified to allow parallel transfers of control. The "program" could as easily be netlists for integrated circuits as a software source for software programs, or VHDL description for hardware. It should also be noted that a "process" refers to the execution or operation of a program, normally consisting of a collection of steps.

A common representation found in many optimizing compilers for sequential languages is described in "Compilers: Principles, Techniques and Tools" by Alfred V. Aho, Ravi Sethi, and Jeffrey D. Ullman, ISBN 0-201-10088-6. In Section 9.4: "Basic blocks and flow graphs", this book describes how ordinary code can be regarded as a series of data-flow networks comprising operation nodes connected by data links (arcs, edges). The operation nodes are nodes with one or more in-ports and one or more out-ports. Each out-port of an operation node may be connected to one or more in-ports of some operation node.

Figure 1:
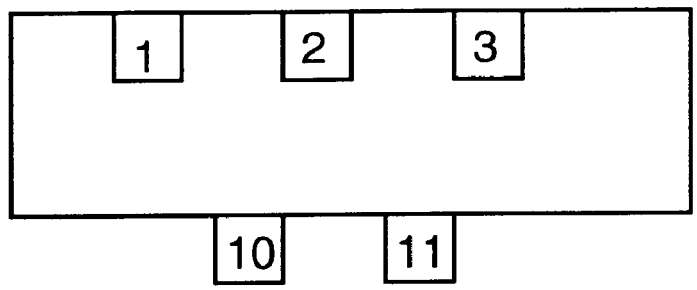
FIG. 1 is a schematic box of an operation node found in a program design.

FIG. 1 shows an operation node in which the in-ports 1, 2 and 3 are on the inside of the box and out-ports 10 and 11 are on the outside. In-ports and out-ports are numbered sequentially. The name of the operation node, a description of it, or both, may appear on the inside of the box. An operation node does nothing until it has a value on each of its in-ports and no value on any of its out-ports. At that point, it is enabled to "fire", placing a value on each of its out-ports. When an out-port is connected to one or more in-ports such that all of the in-ports are empty, the value at the sending end (out-port) may be transferred to the receiving end (in-port). This clears the out-port.

Figure 2:
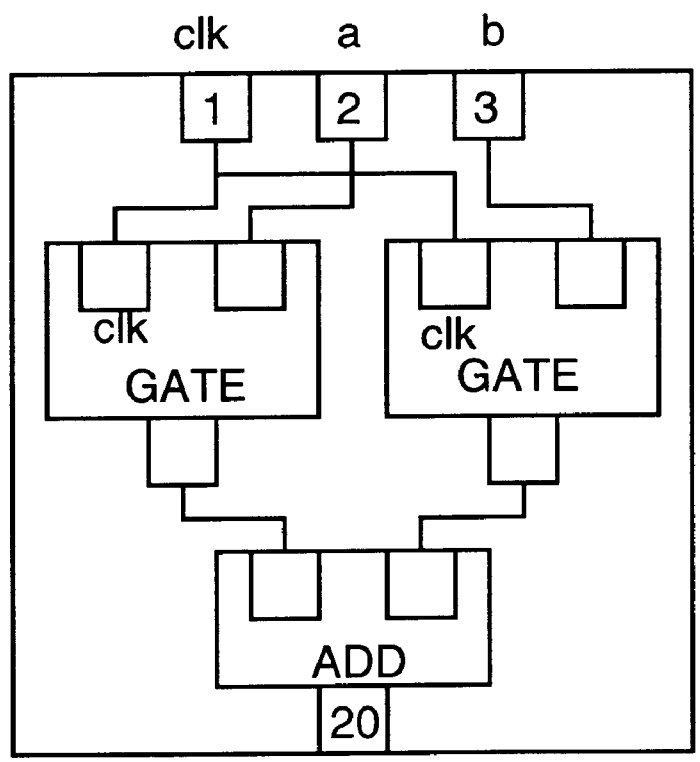
FIG. 2 is a schematic illustration of an example network of the operation node.

An operation node is connected to other operation nodes by means of data links (arc, edges) to form data-flow networks. FIG. 2 illustrates by way of example one implementation of a GateAdd network. The network awaits a clock synchronization signal on in-port 1 and InData values, e.g. a and b, on in-ports 2 and 3. When all are present, it fires a yielding signal on out-port 20. This network is a synchronous (clocked) adder made up of asynchronous ones.

This view of programs which is the basis for the PROGRAM MODEL used in this disclosure, with the addition of invocation operations which can cause sub-programs to be executed. A PROGRAM, then, has a standard 2-level representation as a control-flow graph where nodes of the control-flow graph represent basic blocks (BB's), and embed acyclic data-flow graphs (DFG) which are the computations performed in those basic blocks. There is a distinct "start" basic block where execution begins and on whose in-ports the inputs to the program are placed. An initial state (initial values to be placed in some of the program's entry ports before execution starts) is also allowed.

Figure 3:
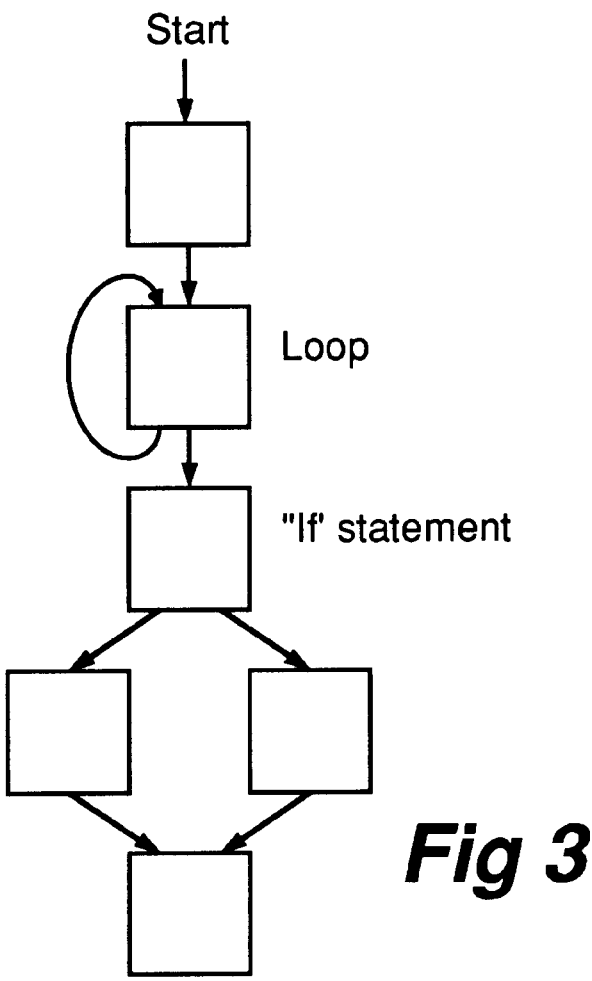
FIG. 3 is an example of simple program design which is partitioned into basic blocks.

FIG. 3 depicts an example of a program which is partitioned into BBs, each of which is shown by a box. For illustration purposes, it includes a loop BB and an "if" statement BB to indicate that if a certain condition is met, execution loops.

With the above view of BBs, a BB is a sequence of consecutive statements in which flow of control enters at the beginning and leaves at the end without halt or possibility of branching except at the end. Therefore a BB represents an unconditional, non-looping code sequence similar to a "straight-line" code sequence in sequential languages.

BBs are connected together, that is to say, links (arcs, edges) connect some exit ports of some BBs to some entry ports of other BBs.

An INVOCATION OPERATION copies a ROUTINE (creating a routine "instance"), placing the values on its in-ports on the entry ports of the instance. INVOCATION OPERATIONS comprise CALL OPERATIONs and FORK OPERATIONs. A CALL OPERATION, once it initiates the execution of an instance of a routine, awaits termination of the instance, and then places the values on the exit ports of the instance on its corresponding out-ports. Hence a CALL OPERATION corresponds to a procedure or function call. A FORK OPERATION does not await termination of the instance, and when the instance terminates, it is simply discarded. Hence a FORK OPERATION corresponds to process/task creation.

Irrespective of the degree of parallelism in the program, it can be considered to execute as a series of 'essentially' sequential processes, where a process is either the execution of the MAIN routine and the routines it calls, or the execution of a process (routine instance) activated by a FORK operation or the routines it calls. A process other than the MAIN process can only be generated by use of the FORK OPERATION. The parallelism in the program is collapsed into a single sequential stream of processes; this is widely implemented in any of the multi-tasking operating systems.

This view is suitable for many hardware designs because:
1. Extensive (but bounded) parallelism internally within each process is allowed.
2. The grain of processes generated by FORK OPERATION can be arbitrarily small, down to the level of a single operation node.

Many hardware designs, and programs in high-level sequential or parallel programming languages and representing shared memory, message passing, and distributed designs, can be encoded in the above form, as well as programs in lower level form such as assembly language.

A PROGRAM comprises a MAIN ROUTINE plus a set of other routines, plus an INITIAL STATE giving values for some of the ENTRY PORTs of the program. Execution begins with values according to the INITIAL STATE on the specified entry ports, and the INPUT to the program in the other ENTRY PORTs of the program.

The encoding process according to the invention must achieve behavior preservation and proximity inversion. Hereinafter, this encoding of the invention is called EIS (Effectively Immutable Software and Hardware) encoding and achieves the objects mentioned earlier. Throughout this specification, EIS or EIS encoding is used for the sake of brevity in place of Effectively Immutable Software and Hardware Encoding.

Proximity Inversion:

A program P is proximity inverting if any small change in P must cause a large change in the behavior of P.

An EIS encoding takes an ordinary program P, and outputs a proximity inverting program Q with the same behavior as P. In some sense, the "clear design principles" are aiming to preserve proximity, even to create regions (typically called modules) to limit proximity. As discussed previously, "anti-clear" design does not guarantee proximity inversion, it merely does not actively prevent it.

Cascade:

A cascade is an acyclic DFG such that each of the output ports depends on all of the input ports. The intent is that changing any input value will change almost all of the output values, with high probability. In other words, a cascade is a block of computation such that each of the outputs is dependent on all of the inputs. Another way is to look at the dependency graph of the cascade: it will be one single dense graph with no independent sub-graphs.

Figure 4:
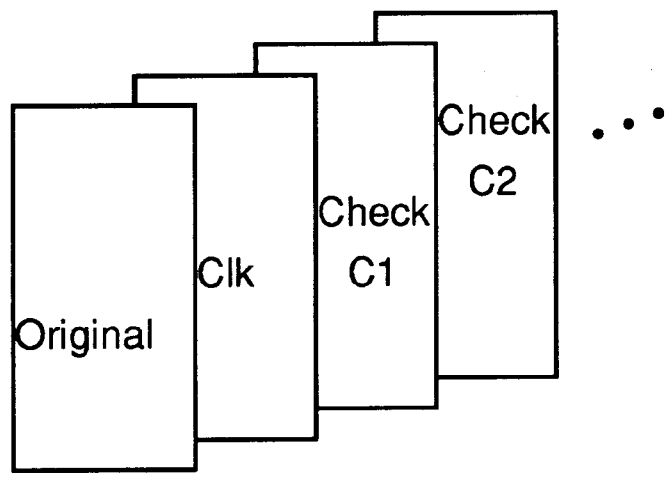
FIG. 4 shows that there are many cascades which are similar to the original program design.

Cascades are primarily used as a "back-bone" of the dense dependency graph. That is, the cascades for each basic block are connected together using the control graph, thus forming a program that parallels the original program, but has a dense and complex dependency. As the only interest is in the dependency graph, the result of the computation does not really matter. As seen in FIG. 4, it is possible to generate various cascades which are similar to the original program, such as the clock cascade, checking cascades C1 and C2 etc.

The original program is then intertwined with these cascades, thereby "hiding" the original dependency graph. In other words, the original dependency graph (which can be very regular and/or simple) is "merged" into an artificially constructed monstrosity. This makes it extremely difficult to recover the original dependency graph (thus defeating one of the major avenues of reverse engineering).

Some measures of the "goodness" of a cascade are:

for each opnode, the number of outputs affected by it; and for each opnode, the number of subsequent opnodes affected by it.

A simple way of constructing a cascade is to use a shuffle network of the desired size, for example a Banyan network. Replace each of the 2×2 switch elements with an intertwining function of 2 inputs and 2 outputs. This resultant network will be a cascade. Even though it is sufficient to use cascades with regular structure, it is obviously desirable to use cascades with irregular structure.

Intertwining Functions:

A M→N (from M to N) intertwining function F is a function with M inputs and N outputs. F is required to be (almost always) invertable and each of the outputs depend on all of the inputs. More formally: an intertwining function is a sub-DFG with multiple inputs and outputs such that every output is a function of more than one input, and the aggregate function from the inputs to the outputs is invertable (i.e., preserves information) with high probability. Such functions are used for several purposes:

(1) to create cascades: to construct a cascade, one needs to create a network from M inputs to N outputs, where M and N are larger than two. The form of the network should be such that if each node is a multi-input, multi-output switch which can direct any of its inputs to any of its outputs, then every output of the network is reachable from every input of the network, depending on the direction of information flow taken at each switch node. (Examples of such networks are Banyan and Omega shuffle-exchange networks.) To convert the network from a switching network to a cascade, we replace each switching node with an intertwining function having the same number of inputs and outputs as the switching node. "Multi" in this description means "more than one". For example, for Banyan and Omega networks, 2-input, 2-output switching elements are used, so we would replace them with 2-input, 2-output intertwining functions in our cascade.

Figure 5:
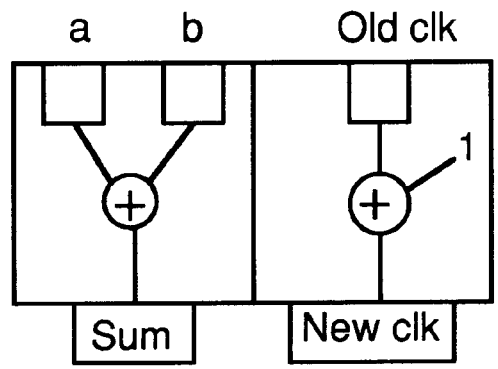
FIG. 5 shows a simple instance where two strands of operations, e.g. original program design and the clock, are combined.
Figure 6:
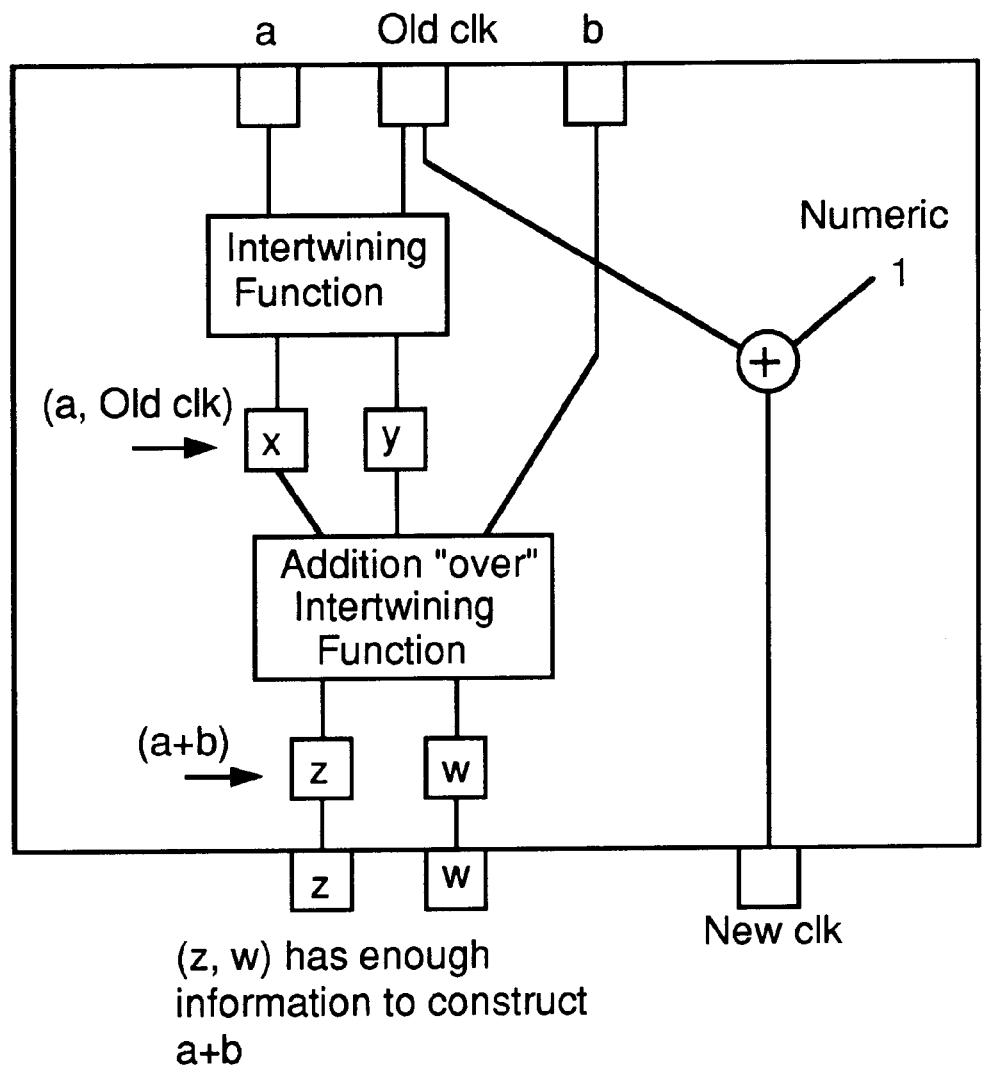
FIG. 6 shows schematically an example of intertwining the code of FIG. 5.
Figure 7:
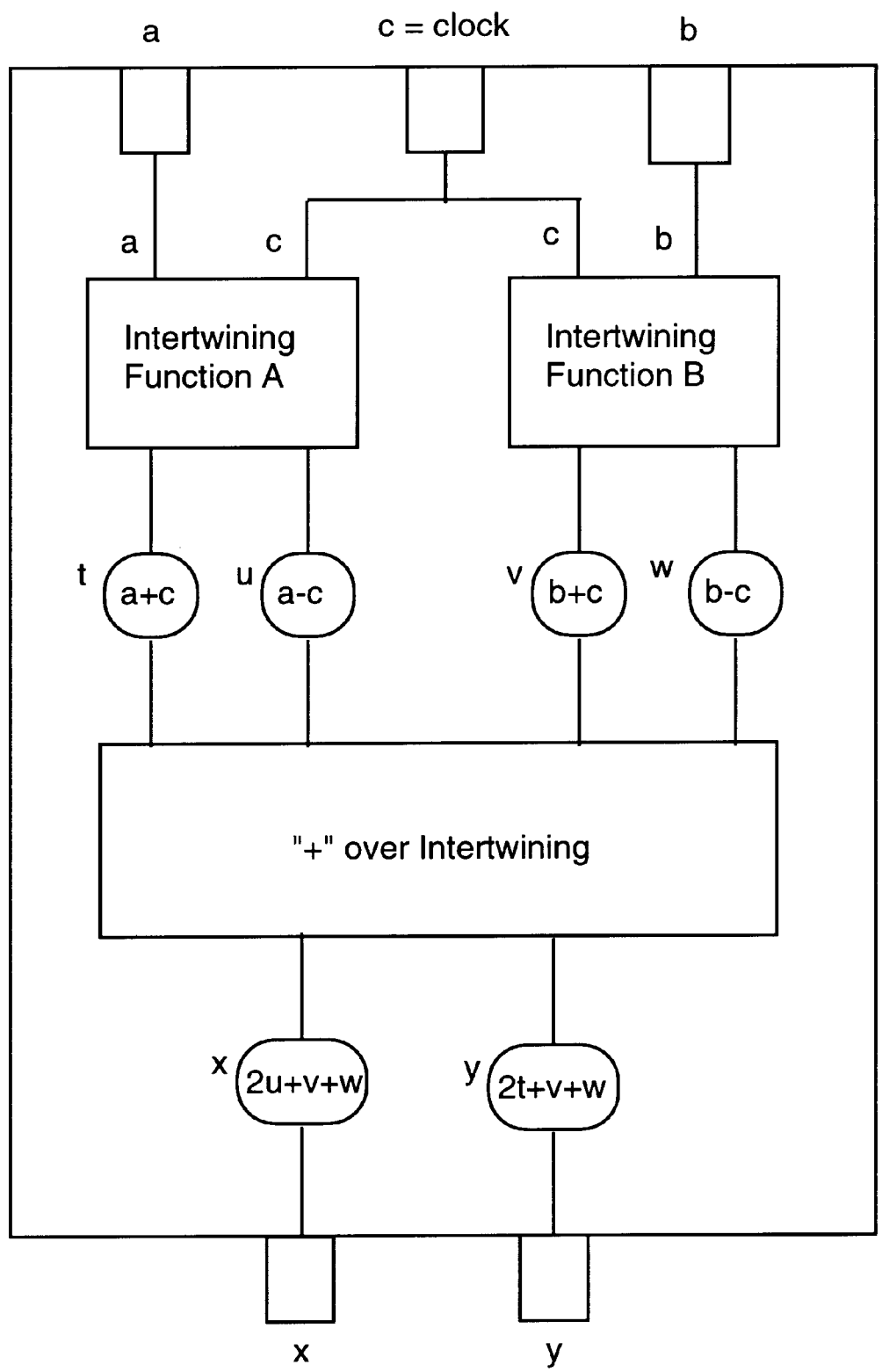
FIG. 7 shows schematically a an alternative example of intertwining the code of FIG. 5.

(2) to increase the density of interdependencies in the program: say there are independent strands of computation (i.e., the output of one does not depend on the input of the other); we can combine the little dependency graphs into a big dependency graph by intertwining the inputs to the strands. FIG. 5 shows a simple case with two strands: the original program and the clock. FIG. 6 shows the result of applying one single intertwining to the code of FIG. 5, and FIG. 7 shows the result of applying two alternative intertwinings to the code of FIG. 5.

(3) to change the domain of computation: this is best explained by an example. Consider the DFG in FIG. 5. The computation is clearly visible as "a+b". FIG. 7 shows the same program with two instances of intertwining and how "arithmetic over intertwining" is done. For simplicity of explanation, the clock calculation is ignored and a single intertwining function is used: (a,b)→(a+b, a−b); that is, the two inputs are "a" and "b', and the outputs are "a+b", and "a−b". This operation is analogous to the modulation function used in FM stereo broadcast to encode the left and right channels. "a+b" is the main signal that is receivable by mono receivers, while the "a−b" signal is used by stereo receivers to recover the original channel signals "a" and "b".

First, two pairs of inputs (a,c) and (b,c) are intertwined, producing four intermediate results labeled t,u,v,w. Note that (t,u) encodes the values of a and c, and (v,w) encodes b,c. Only the encoded values need be operated on to produce the desired sum s=a+b. The output (x, y) then encodes the value of s and subsequent calculation can do arithmetic in the same way, so the actual value of a+b does not appear in the program which has been encoded by EIS encoding (indeed, the variables "a" and "b" never appeared together at all). The algebraic calculation can be followed as shown below:

$$t=a+c$$

$$u=a-c$$

$$v=b+c$$

$$w=b-c$$

Solving for the input variables as a function of the intermediate variables:

$$\text{pi } a=(t+u)/2$$

$$c=(t-u)/2 \text{ or } (v-w)/2$$

$$b=(v+w)/2$$

Simplifying "y":

$$y=2t+v+w=(t+u)+(v+w)+(t-u)=2*(a+b+c)=2*(s+c)$$

Similarly, simplifying "x"

$$x=2u+v+w=(t+u)+(v+w)-(t-u)=2*(a+b-c)=2*(s-c)$$

therefore:

$$x+y=2*(s+c)+2*(s-c)=2*(2s)=4s$$

or:

$$s=(x+y)/4$$

According to another embodiment, the process includes further steps of adding a history checking code, which is used to detect tampering with the execution path (for example, by using a debugger to change the values controlling a conditional branch), and intertwining the code with the original executable program design and other components as disclosed herein.

History can be checked by introducing two variables: "come-from" and "go-to". At the end of each basic block, before the jump, the two variables would be set to the two end points of the jump. At the beginning of each basic block, a code is inserted to check that "go-to" indeed points to where there is actual execution and then "come-from" is one of the legitimate precedents.

According to the invention, the EIS encoding process is performed as described below. Steps in the process all refer to a random bit-stream for the purpose of making decisions. They consume this random stream as decisions are made. The random bit stream thus functions as a "one time pad" in cryptography, except that no decryption is normally ever required (nor is it possible in most cases). For maximum security, a source of true randomness should be used, but a good pseudo-random source will work reasonably well (and be more repeatable for testing purpose).

Following is the detailed algorithm for one embodiment of the invention.

100: Initialization:

120: Prepare the input program by turning it into DFG (Data Flow Graph).

140: Clock and TamperFlag strategy:

decide if duplicate clocks are needed, etc.

add Clock/TamperFlag initialization code to each entry BB generate some number of clock cascades: e.g. different ways of incrementing, different amounts of increment, etc.

160: Cascade strategy:

decide on how many copies of different cascades decide on width and length of each cascade

180: Generate Trap code: (used to jail upon detection of tampering)

decide on how many different trap code loops to generate generate random basic blocks that are similar to the original program (e.g., copy an original BB and perturb it a little).

200: Add cascades to each BB:

220: Pick a clock cascade and make a copy for this BB

240: Generate checking cascades entry BB's need to initialize the cascades (probably with random data values)

non-entry BB's inherit values from predecessor BB's and can add random constants as well matched pairs of checking cascades need to have matched input values as well

260: Replace all original constants with a randomly generated equivalent, e.g. 37 can be replaced by 25+12.

300: Intertwine each BB

320: Insert checks and traps as needed:

if cascades computed values different from expected, set TamperFlag and start a timer if TamperFlag is set and timer has expired, go to trap code.

340: Initialize the "wavefront" of computations that are eligible to fire (because all their input values are already computed and all other ordering constraints are satisfied).

360: Pick a random pair of values from the ready wavefront for intertwining:

random decoy computation is added to ensure the computations pair up for intertwining random decoy computation is also added to hide the true dependency graph.

361: Given a pair of values:

pick a random intertwining function replace the two separate computations with the single computation of the intertwining function.

380: Update wavefront:

if wavefront is not empty, go to step 360.

What is claimed is:

1. A process of encoding an executable program design for tamper protection and concealment of information contained therein such that the encoded program design remains executable comprising steps of:

a) generating one or more checking cascades for each of one or more basic blocks of the executable program design, each checking cascade having at least as many operations as said each respective basic block and having a length and width for a preset security level;

b) inserting periodic checking codes distributed over said checking cascades, said checking codes for monitoring expected output of said checking cascades at predetermined points in said executable program design; and c) intertwining said executable program design and said checking cascades so that outputs of said encoded executable program design depend upon all inputs of said executable program design and checking cascades.

2. The process of encoding an executable program design according to claim 1 comprising a further step of:

for every or some checking cascades, generating two or more identical copies of a respective checking cascade so that the outputs of the identical copies can be checked for matching.

3. The process of encoding an executable program design according to claim 2 comprising further steps of:

f) generating a clocking cascade which carries a tampering flag and a clock, which are advanced at least one tick at one or more selected points of a selected set of branching program steps; and g) intertwining said executable program design, clocking cascade and checking cascade.

4. The process of encoding an executable program design according to claim 3 comprising a further step of:

h) appending a trap code at one or more selected points of the program design, said trap code to be executed in response to said tampering flag and clock in that execution of said trap code is so constructed as to cause cessation of normal execution.

5. The process of encoding an executable program design according to claim 4 comprising a further step of:

i) appending one or more trap codes to said clocking cascade, each trap code to be executed in response to said tampering flag and clock; and j) for each trap code, repeating steps d) and e) recursively so that each trap code is also tamper protected.

6. The process of encoding an executable program design according to claim 5 wherein execution of said trap code is so constructed as to cause one or any of the following steps to be performed in a predetermined order:
   (1) emitting a warning message and terminating execution of said program design;
   (2) terminating abnormally execution of said program design without a warning message; and
   (3) executing a program which loops indefinitely within the said trap code.

7. The process of encoding an executable program design according to claim 5 comprising a further step of:
   controlling the intensity of intertwining to vary the security and performance of said encoded program design.

8. The process of encoding an executable program design according to claim 5 comprising a further step of:
   controlling the width and multiplicity of any of said checking and clocking cascades to vary the security and performance of said encoded program design.

9. The process of encoding an executable program design according to claim 5 comprising a further step of:
   controlling the width and multiplicity of cascades of one or more selected basic blocks which are more vulnerable to attack to vary further the security and performance of said encoded program design.

10. The process of encoding an executable program design according to claim 5 comprising a further step of:
    controlling the intensity of intertwining of cascades of one or more selected basic blocks which are more vulnerable to attack to further vary the security and performance of said encoded program design.

11. The process of encoding an executable program design according to claim 5 comprising a further step of:
    inserting a clock setting and clock reading code into said periodically inserted checking codes, with a trap code to be executed in response to said tampering flag and the read value of said clock, thereby introducing a variable time delay before said trap code is executed.

12. The process of encoding an executable program design according to claim 5 comprising a further step of:
    locating security entry and exit cells of a non-branching program step; and
    controlling the width and multiplicity of said associated cascades to increase the security of said encoded program design.

13. The process of encoding an executable program design according to claim 4 wherein execution of said trap code is so constructed as to cause one or any of the following steps to be performed in a predetermined order:
    (1) emitting a warning message and terminating execution of said program design;
    (2) terminating abnormally execution of said program design without a warning message; and
    (3) executing a program which loops indefinitely within the said trap code.

14. The process of encoding an executable program design according to claim 4 comprising a further step of:
    controlling the intensity of intertwining to vary the security and performance of said encoded program design.

15. The process of encoding an executable program design according to claim 4 comprising a further step of:
    controlling the width and multiplicity of any of said checking and clocking cascades to vary the security and performance of said encoded program design.

16. The process of encoding an executable program design according to claim 4 comprising a further step of:
    controlling the width and multiplicity of cascades of one or more selected basic blocks which are more vulnerable to attack to vary further the security and performance of said encoded program design.

17. The process of encoding an executable program design according to claim 4 comprising a further step of:
    controlling the intensity of intertwining of cascades of one or more selected basic blocks which are more vulnerable to attack to further vary the security and performance of said encoded program design.

18. The process of encoding an executable program design according to claim 4 comprising a further step of:
    inserting a clock setting and clock reading code into said periodically inserted checking codes, with a trap code to be executed in response to said tampering flag and the read value of said clock, thereby introducing a variable time delay before said trap code is executed.

19. The process of encoding an executable program design according to claim 4 comprising a further step of:
    locating security entry and exit cells of a non-branching program step; and
    controlling the width and multiplicity of said associated cascades to increase the security of said encoded program design.

20. The process of encoding an executable program design according to claim 3 comprising a further step of:
    controlling the intensity of intertwining to vary the security and performance of said encoded program design.

21. The process of encoding an executable program design according to claim 3 comprising a further step of:
    controlling the width and multiplicity of any of said checking and clocking cascades to vary the security and performance of said encoded program design.

22. The process of encoding an executable program design according to claim 3 comprising a further step of:
    controlling the width and multiplicity of cascades of one or more selected basic blocks which are more vulnerable to attack to vary further the security and performance of said encoded program design.

23. The process of encoding an executable program design according to claim 3 comprising a further step of:
    controlling the intensity of intertwining of cascades of one or more selected basic blocks which are more vulnerable to attack to further vary the security and performance of said encoded program design.

24. The process of encoding an executable program design according to claim 3 comprising a further step of:
    locating security entry and exit cells of a non-branching program step; and
    controlling the width and multiplicity of said associated cascades to increase the security of said encoded program design.

25. The process of encoding an executable program design according to claim 2 comprising a further step of:
    controlling the intensity of intertwining to vary the security and performance of said encoded program design.

26. The process of encoding an executable program design according to claim 2 comprising a further step of:
    controlling the width and multiplicity of cascades of one or more selected basic blocks which are more vulnerable to attack to vary further the security and performance of said encoded program design.

27. The process of encoding an executable program design according to claim 2 comprising a further step of:

controlling the intensity of intertwining of cascades of one or more selected basic blocks which are more vulnerable to attack to further vary the security and performance of said encoded program design.

28. The process of encoding an executable program design according to claim 2 comprising a further step of:

locating security entry and exit cells of a non-branching program step; and controlling the width and multiplicity of said associated cascades to increase the security of said encoded program design.

29. The process of encoding an executable program design according to claim 1 comprising a further step of:

controlling the intensity of intertwining to vary the security and performance of said encoded program design.

30. The process of encoding an executable program design according to claim 1 comprising a further step of:

controlling the width and multiplicity of cascades of one or more selected basic blocks which are more vulnerable to attack to vary further the security and performance of said encoded program design.

31. The process of encoding an executable program design according to claim 1 comprising a further step of:

controlling the intensity of intertwining of cascades of one or more selected basic blocks which are more vulnerable to attack to further vary the security and performance of said encoded program design.

32. The process of encoding an executable program design according to claim 1 comprising a further step of:

locating security entry and exit cells of a non-branching program step; and controlling the width and multiplicity of said associated cascades to increase the security of said encoded program design.

33. The process of encoding an executable program design according to claim 1 comprising a further step of:

inserting history checking codes to detect tampering of the execution path; and intertwining the said history checking code with the executable program design and other cascades.

34. An encoded executable program design stored in a machine readable medium, the program design being tamper protected and concealing information contained therein, comprising:

one or more checking cascades intertwined with the program design, said one or more checking cascades having a length and width for a preset security level, and periodic checking codes distributed over said one or more checking cascades for monitoring expected outputs of said checking cascades at predetermined points in said program design.

35. The encoded executable program design according to claim 34, further comprising one or more checking cascades for each of one or more basic blocks of the program design, each checking cascade having at least as many operations as said each respective basic block.

36. The encoded executable program design according to claim 35 further comprising, for every or some checking cascades, two or more identical copies of a respective checking cascade.

* * * * *